2,991,219
FLY REPELLENT
Willis Nels Bruce, Champaign, Ill., assignor to Lee Ratner, Miami Beach, Fla.
No Drawing. Original application Mar. 12, 1956, Ser. No. 570,696, now Patent No. 2,937,969, dated May 24, 1960. Divided and this application Jan. 19, 1960, Ser. No. 3,279
8 Claims. (Cl. 167—22)

The present invention relates to new and improved fly repellents and fly repellent compositions and, while not strictly limited thereto, the invention is particularly concerned with safe and effective fly repellents and fly repellent compositions useful to farmers in the protection of their dairy cattle from biting as well as non-biting flies, such as house flies, horse flies, stable flies, horn flies, etc.

This application is a division of my copending patent application Serial No. 570,696, filed March 12, 1956, now Patent No. 2,937,969.

There can be little doubt concerning the benefits derived from good fly control practices in terms of increased milk and meat production. Prior workers in this art have endeavored for some time now to increase the fly control periods with a safe quantity of repellent in order to increase the benefits derived from good fly control. At present the commercially available cattle fly repellent sprays, when used at the recommended dosage of 2 ounces per animal, will give approximately 80 to 90% reduction in stable fly populations for a period of only ½ to 3 hours.

It is well known to entomologists that insects are quite specific in their respones to repellents. As an example, mosquito repellents such as Rutgers 612 (2-ethyl-1,3-hexanediol), dimethyl phthalate, dimethyl carbate, Indolone (butyl ester of 3,4-dihydro 2,2 dimethyl-4-oxo-2H-pyran-6-carboxylic acid), etc., are of no practical value when applied to cattle in warding off the attack of biting flies. For this purpose other kinds of repellents were developed. Among these are Thanite (iso-bornyl-thiocyanoacetate), Crag Fly Repellent (butoxy polypropylene glycol), Lethane 348 (beta-butoxy-beta-thiocyanodiethyl ether), and the activated pyrethrin sprays. None of these can safely be used in quantities to effect a high order of fly control (90% repellency) for periods of more than a few hours. There also are serious implications of contamination of the milk when large quantities of these materials are used, as well as injury to the animal itself. Therefore, practical limits in dosage of active ingredients per animal must not be exceeded to produce beneficial results. Concentrate sprays can be applied safely to cattle if the quantity is limited to a few milliliters per animal. All of these factors must be borne in mind when considering the present invention.

It is an object of the invention to produce and provide fly repellents and fly repellent compositions which will give cattle a high level of protection from flies, not for just 2 or 3 hours, but throughout the day.

A further object of the invention is to provide fly repellents and fly repellent compositions which are safe, highly effective for long periods of time and which greatly enhance methods of control widely used by farmers to protect their dairy cattle from biting and non-biting flies.

It has now been found, in accordance with the present invention, that the n-butyl and n-propyl di-esters of 4-carbon atom dicarboxylic acids, namely maleic, fumaric and succinic acids, afford safe, highly effective and long lasting fly repellency action for the purposes herein indicated, either when employed per se or in solutions or aqueous emulsions. The specific esters falling within the foregoing class are di-n-propyl maleate, di-n-butyl maleate, di-n-propyl succinate, di-n-butyl succinate, di-n-propyl fumarate and di-n-butyl fumarate.

It is thought that safe repellents are those which, if absorbed by the animal tissue, would be readily metabolized into usable organic compounds. For example, the butyl alcohol residue of the butyl esters when released within the body should readily oxidize to butyric acid and then decarboxylate to carbon dioxide and water. Thus constituted, di-n-butyl succinate or di-n-butyl fumarate, as well as the other esters, could safely be used in dilute or concentrated solutions upon animals, or as emulsifiable concentrates which are diluted with water for saturating spraying of animals. Acute toxicity tests with these esters indicate that they are innocuous.

It has been found, in accordance with the invention, that certain synergists when used in combination with the aforesaid alkyl esters of dicarboxylic acids, will render said esters much more effective. This is a very surprising discovery because the synergists employed to increase the effectiveness of the esters are in and of themselves absolutely ineffective to repel flies. The synergists employed are various unsaturtaed fatty acids and fatty acid esters. The discovery that these various fatty acids and fatty acid esters are synergists for the ester fly repellent of the present invention was even more surprising because these fatty materials not only do not repel flies, but they are actually used in fly baits to attract flies.

In order to test or evaluate the effectiveness of the fly repellent esters of the present invention, as well as to test and evaluate the effectiveness of said repellents in combination with synergists, both laboratory and field repellency tests were carried out. First, with respect to laboratory tests, the following procedure was followed:

Weighed lactose pellets, used as bait, were placed upon filter paper which was impregnated with the test solution. The filter paper was folded, to form a slightly conical surface which prevented the pellet from being moved by the flies. The actual procedure was as follows: The solution of the repellent in acetone was applied to the folded 5.5 cm. filter paper by means of a micro-pipette. In the case of the ester repellent, sufficient solution was used to leave 10 mg. of the repellent on the paper. When a combination of ester and synergist was tested, sufficient solution was employed to leave 5 mg. each of repellent and synergist on the paper. The weighed pellet was placed in the center of the paper after the solution had diffused evenly throughout the paper. Usually 20 to 30 minutes' aging in a moist chamber (100% humidity) at 80° F. were required for even distribution of the liquid. The filter paper with the pellet was then placed upon a turntable in an exposure cage. The turntable, powered by a 4 r.p.m. timer motor, was in operation during all exposure periods. The pellet could be removed from the filter paper at any desired period after treatment or pellets could be placed on the filter paper for hourly periods after treatment. It was possible to obtain the over-all 24-hour repellency of a solution by allowing the pellet to remain in the cage for 24 hours before removal. Tests were conducted at a constant temperature of 80° F. As standard procedure about 150 adult flies were used for each filter paper to be tested. Usually ten to twenty papers and pellets were exposed simultaneously. All pellets removed from test papers were dried in an oven (60° C.) for 24 hours and then reweighed. The amount of lactose lost by feeding indicated the relative repellency of the material used, since the fly had to contact the treated filter paper during feeding.

Two sizes of lactose pellets were used—a small 35–37 mg. pellet for short exposures, and a larger 78–80 mg. pellet for 8 to 24 hours or more of continuous exposure. Constant illumination was provided by a 100-watt light bulb suspended approximately 12 inches above the turntable cage. A 50 ml. beaker containing a folded paper wick and water was placed in the center of the turntable to supply the flies with needed water.

The weight loss data obtained may be analyzed statistically or may be transformed into percent repellency by the following formula:

Percent repellency $$= \frac{\text{Original wt. of pellet, mg.} - \text{mg. consumed by flies} \times 100}{\text{Original wt. of pellet, mg.}}$$

Laboratory repellency tests carried out in accordance with the foregoing procedure gave the following results for the indicated repellent or repellent composition:

| Repellent | 30 min. | 600 min. | 1,200 min. | 3,000 min. | 4,500 min. |
|---|---|---|---|---|---|
| di-n-propylmaleate | 100 | F | 00.0 | 00.0 | 00.0 |
| di-n-butylmaleate | 100 | 100 | 71.0 | 29.4 | 00.0 |
| di-n-butylsuccinate | 100 | 100 | 92.1 | 69.3 | 27.4 |
| di-n-propylsuccinate | 100 | F | 6.8 | 00.0 | 00.0 |
| di-n-propylfumarate | 100 | 100 | 90.1 | 71.2 | 21.0 |
| di-n-butylfumarate | 100 | 100 | 93.2 | 59.7 | 36.3 |
| di-n-butylsuccinate plus oleic acid | 100 | 100 | 100 | 96.1 | 87.3 |
| di-n-butylsuccinate plus propyl oleate | 100 | 100 | 99.2 | 91.4 | 77.2 |
| di-n-butylsuccinate plus benzyl oleate | 100 | 100 | 100 | 95.5 | 85.9 |
| oleic acid | 0.0 | is attractive rather than repellent | | | |

Laboratory tests were also carried out to determine the optimum ratio of ester repellent to synergist. A total of 10 mg. repellent and/or synergist was added to each 5.5 cm. filter paper and aged at 80° F. and 100% relative humidity for 20 hours. The results of these tests are tabulated hereinbelow:

| di-n-butyl-succinate, mg. | Synergist oleic acid, mg. | Average Percent Repellency for Three Groups |
|---|---|---|
| 10 | 0 | 91.9 |
| 8 | 2 | 95.3 |
| 6 | 4 | 99.2 |
| 5 | 5 | 99.6 |
| 4 | 6 | 88.4 |
| 2 | 8 | 15.3 |
| 0 | 10 | 0.0 |

It will be seen from the foregoing table that, when ester repellent-synergist combinations are employed, best results are obtained when the synergist comprises 20 to 60% of the combination.

In order further to evaluate the addition of oleic acid, as well as other unsaturated fatty acids, to the repellents of the present invention, and also to ascertain the desirability of the addition of other additives, another series of laboratory tests was conducted in a manner heretofore set forth. In the tests, 10 mg. di-n-butyl succinate were used with each additive. Percent repellency of various mixtures of repellent and additive was determined by applying the mixture to 5.5 cm. filter papers and exposing the treated papers to flies. The following results were observed:

| Additive: | Percent repellency 48 hours after treatment |
|---|---|
| None | 00.0 |
| 2.5 mg. oleic acid | 22.3 |
| 5 mg. oleic acid | 48.7 |
| 10 mg. oleic acid | 97.8 |
| 20 mg. oleic acid | 100.0 |
| 30 mg. oleic acid | 100.0 |
| 60 mg. oleic acid | 100.0 |
| 10 mg. Atlox 1045-A (polyoxyethylene sorbitol esters of mixed oleic and lauric acids) | 52.1 |
| 10 mg. Span 85 (sorbitan trioleate) | 84.0 |
| 10 mg. Span 80 (sorbitan mono-oleate) | 88.8 |
| 10 mg. Atlox 3335 (polyoxyethylene sorbitan esters of mixed fatty and resin acids) | 38.2 |
| 30 mg. palmitic acid | 13.3 |
| 30 mg. lauric acid | 3.0 |
| 30 mg. stearic acid | 00.0 |
| 30 mg. caprylic acid | 8.2 |
| 30 mg. linoleic acid | 85.3 |
| 30 mg. ricinoleic acid | 68.2 |

The foregoing results show that additions of various amounts of oleic acid increase the repellency of the di-n-butylsuccinate. Unsaturated fatty acids increase the repellency remarkably, whereas saturated fatty acids increase repellency only slightly.

As previously indicated, the repellents of the present invention may be applied per se to animals, but in most cases it is desirable to employ the repellents with a carrier or vehicle, i.e., either in oil solutions or in emulsifiable concentrates. Actually, the amount of repellent or repellent mixture in the carrier or vehicle may be varied over extremely wide limits but it is recommended that not less than 2% repellent be included in any repellent-vehicle mixture. When oil solutions are employed, a 2% to 5% repellent-in-oil solution is used on animals at a rate of 2 oz. per head for 24–72 hours of protection. Synergists and additives may be used in concentrations of 2% to 10% to extend repellency beyond 72 hours. For 2 to 7 days' protection, 5% to 20% repellent-in-oil solutions are employed, and 5% to 95% synergists and additives may also be employed. Emulsion concentrates may be made up of 20% to 90% repellent with 10% emulsifier such as Atlox 1045-A, the remainder comprising an additive or synergist, the amount of emulsifier being variable according to the stability of emulsion devised.

In formulating repellent-in-oil solutions, mineral oil fractions are desirable as carriers or diluents. The following diluents have been satisfactorily employed:

| Code No. | Oil | Mol. Wt. | Microdye Analysis | | Composition—NDM Method | | | | Percent U.R. |
|---|---|---|---|---|---|---|---|---|---|
| | | | Percent PN | Percent O | Percent A | Percent P | Percent N | Percent A | |
| L-2687 | No. 9 | 198±5 | 96 | Trace | 4 | 73 | 27 | 0 | 96.6 |
| L-1543 | Min. Seal | 245±10 | 87 | 0 | 13 | 62 | 31 | 7 | 93.8 |
| L-8715 | N-Octadecane | 254.4 | 100 | 0 | 0 | 100 | 0 | 0 | 100.0 |
| L-6942 | Eureka | 288±5 | 100 | 0 | 0 | 66 | 34 | 0 | 100.0 |
| L-53 | Acme | 324±10 | 92 | 0 | 8 | 64 | 34 | 2 | 97.6 |
| L-111 | Premier | 330±5 | 98 | 0 | 2 | 64 | 36 | 0 | 100.0 |
| L-8382 | Superla No. 10 | 352 | 97 | 0 | 3 | 65 | 35 | 0 | 100.0 |

| Code No. | Viscosity, SSV at 100° F. | Ave. Carbon | Aniline Pt. (° C.) | Gravity (°API) | Sp. Gr. at 20° C. | 50% Dist. Pt (° F.) | Ref. Index 20° C. | Sp. Dispersion |
|---|---|---|---|---|---|---|---|---|
| L-2687 | | 13 | 72.7 | 45.8 | .7850 | 420 | 1.4410 | 103.2 |
| L-1543 | 42.5 | 18 | 83.5 | 37.4 | .8345 | 570 | 1.4643 | 106.6 |
| L-8715 | | | | | | | | |
| L-6942 | 54.2 | 20 | 98.8 | 37.2 | .8355 | 629 | 1.4612 | 98.6 |
| L-53 | 79.4 | 22 | 98.2 | 33.9 | .8528 | 685 | 1.4702 | 105.4 |
| L-111 | 75.7 | 22 | 102.5 | 35.1 | .8460 | 681 | 1.4640 | 98.3 |
| L-8382 | 93.1 | 22 | 106.0 | 34.3 | .8507 | 694 | 1.4679 | 99.7 |

Tests were carried out to determine the optimum ratio of repellent to oil solvent. In the tests, oil solvent No. L-6942, identified in the above table, was employed with 10 mg. of di-n-butylsuccinate. Various amounts of oil were used, with the repellent, on 5.5 cm. filter paper and tested 72 hours after treatment. The following results were observed:

| Mg. of oil per 5.5 cm. paper: | Percent repellency |
|---|---|
| 0 | 0.0 |
| 2.5 | 6.5 |
| 5 | 57.4 |
| 10 | 98.1 |
| 15 | 100.0 |
| 20 | 100.0 |
| 25 | 87.4 |
| 30 | 77.6 |
| 40 | 64.2 |
| 50 | 57.7 |
| 100 | 26.0 |
| 200 | 18.4 |
| 400 | 11.7 |

The foregoing results illustrate that oils such as L-6942 are advantageous when added to the repellents in any desirable ratio.

Tests were also carried out to determine the optimum performance of di-n-butylsuccinate (BS) and di-n-butylfumarate (BF) with oil diluents of various molecular weights. In each case, 10 mg. of repellent was used with 20 mg. of oil on each 5.5 cm. filter paper. The following results were observed:

| Oil Code Number | Average Gram Molecular Wt. of Oil | Repellent | Percent Repellency of 5.5 cm. Filter Papers 48 Hrs. After Treatment With Oils Containing Repellents |
|---|---|---|---|
| L-2687 | 198 | BS | 17.2 |
| L-1543 | 245 | BS | 38.4 |
| L-8715 | 254 | BS | 52.7 |
| L-111 | 330 | BS | 69.4 |
| L-8382 | 349 | BS | 75.5 |
| L-53 | 324 | BS | 87.4 |
| L-6942 | 288 | BS | 100.0 |
| Acetone | | BS | 8.0 |
| L-2687 | 198 | BF | 24.1 |
| L-1543 | 245 | BF | 42.6 |
| L-8715 | 254 | BF | 57.8 |
| L-111 | 330 | BF | 73.4 |
| L-8382 | 349 | BF | 79.8 |
| L-53 | 324 | BF | 96.4 |
| L-6942 | 288 | BF | 100.0 |
| Acetone | | BF | 12.7 |

From the foregoing it will be seen that oils of various molecular weights increase the repellency of surfaces treated with the mixtures. Optimum repellency was obtained with oils of intermediate molecular weights (254–349).

In addition to the specific formulations employed above in the field tests, the following are given by way of further examples:

Oil solution for daily application:
 2% di-n-butylsuccinate
 5% oleic acid
 92.5% cattle spray base oil
 0.5% methoxychlor Oil solution for weekly application:
 20% di-n-butylsuccinate
 50% oleic acid
 29% cattle spray base oil
 1% methoxychlor Emulsifiable concentrate for dilution with water:
 10% Atlox 1045-A
 32% di-n-butylsuccinate
 53% oleic acid
 5% methoxychlor It will be readily understood, of course, that in any of the foregoing formulations, the di-n-butylsuccinate may be substituted by di-n-propylmaleate, di-n-butylmaleate, di-n-propylsuccinate, di-n-propylfumarate or di-n-butylfumarate and the oleic acid may be replaced by sorbitan trioleate, sorbitan mono-oleate, linoleic acid, ricinoleic acid, propyl oleate, or benzyl oleate.

While it has been indicated herein that the repellents and repellent mixtures of the present invention have utility in the treatment of cattle so that the cattle will yield more butter fat during the fly season than they would if they were not protected, it will be readily understood, of course, that the repellent and repellent mixtures may be and are used in other environments. For instance, the repellents herein disclosed are effective to repel flies from hogs and horses. Moreover, the repellents may be combined with other repellents, such as Rutgers 612, etc., and applied to humans. Thus, the repellents of the invention possess utility in repelling flies not only from cattle, but from other animals as well, and also from humans.

I claim:
1. A composition for repelling insects comprising, as a repellent, di-n-butyl succinate and, as a synergist, a fatty acid material selected from the group consisting of oleic acid, sorbitan trioleate, sorbitan mono-oleate, linoleic acid, ricinoleic acid, propyl oleate, and benzyl oleate.

2. A composition for repelling insects comprising, as a repellent, a symmetrical diester of a 4-carbon atom dicarboxylic acid esterified with alkyl radicals selected from the group consisting of n-propyl and n-butyl and, as a synergist, oleic acid.

3. A composition for repelling insects comprising, as a repellent, di-n-butyl succinate and, as a synergist, oleic acid.

4. A process for repelling flies from warm-blooded animals which comprises applying to said animals di-n-butyl succinate and, as a synergist, a fatty acid material selected from the group consisting of oleic acid, sorbitan trioleate, sorbitan mono-oleate, linoleic acid, ricinoleic acid, propyl oleate, and benzyl oleate.

5. A process for repelling flies from warm-blooded animals which comprises applying to said animals di-n-butyl succinate and, as a synergist, oleic acid.

6. A method of repelling flies from a surface frequented by flies which comprises applying to said surface di-n-butyl succinate dispersed in oleic acid.

7. A composition comprising as an essential ingredient dissolved in oleic acid from about 2% to about 100% by weight of di-n-butyl succinate.

8. A composition for repelling insects comprising, as a repellent, from about 40% to about 80% by weight of di-n-butyl succinate and, as a synergist, from about 60% to about 20% by weight of a fatty acid material selected from the group consisting of oleic acid, sorbitan trioleate, sorbitan mono-oleate, linoleic acid, ricinoleic acid, propyl oleate, and benzyl oleate.

References Cited in the file of this patent

King: U.S. Dept. Agr. Handbook No. 69, pp. 176, 218, 220, 248, 306, 316 (May 1954).

Smith and Burnett: Jour. Eco. Ent. 42, pp. 439–440.

Linduska: Jour. Eco. Ent. 39, December 1946, pp. 767–769.

Lindquist: Jour. Eco. Ent., 35, August 1944, pp. 485–486.